(12) United States Patent
Wydeven

(10) Patent No.: US 6,743,317 B2
(45) Date of Patent: Jun. 1, 2004

(54) METHOD OF SEALING, HOUSING AND CONSTRUCTING HONEYCOMB FILTERS

(76) Inventor: Robert M. Wydeven, 3613 Edgemere Dr., Appleton, WI (US) 54915

( * ) Notice: Subject to any disclaimer, the term of this patent is extended or adjusted under 35 U.S.C. 154(b) by 147 days.

(21) Appl. No.: 10/015,614

(22) Filed: Dec. 17, 2001

(65) Prior Publication Data

US 2002/0096247 A1 Jul. 25, 2002

Related U.S. Application Data

(60) Provisional application No. 60/256,566, filed on Dec. 19, 2000.

(51) Int. Cl.[7] ............................................... B31C 13/00
(52) U.S. Cl. ....................... 156/193; 156/210; 156/245; 156/267; 156/292
(58) Field of Search ................................. 156/184, 193, 156/210, 242, 245, 267, 292; 210/321.77, 321.86, 343, 493.1, 493.2, 493.3, 493.4, 506; 228/175, 177, 181, 183, 185, 186, 187; 55/520, 521, 524; 428/116, 182; 29/157.3, 157 R, 890.054, 902

(56) References Cited

U.S. PATENT DOCUMENTS

| | | | |
|---|---|---|---|
| 2,599,604 A | | 6/1952 | Bauer et al. |
| 3,020,977 A | | 2/1962 | Huppke et al. |
| 3,025,963 A | | 3/1962 | Bauer |
| 4,065,341 A | | 12/1977 | Cub |
| 4,410,427 A | | 10/1983 | Wydeven |
| 4,589,983 A | | 5/1986 | Wydevan |
| 5,024,870 A | | 6/1991 | Jackson |
| 5,240,540 A | * | 8/1993 | Matsumoto et al. ........ 156/252 |
| 5,435,870 A | * | 7/1995 | Takagaki et al. ............ 156/189 |
| 5,772,883 A | | 6/1998 | Rothman et al. |
| 5,820,646 A | | 10/1998 | Gillingham et al. |
| 5,895,574 A | | 4/1999 | Friedmann et al. |
| 5,902,364 A | | 5/1999 | Tokar et al. |
| 6,179,890 B1 | | 1/2001 | Ramos et al. |
| 6,190,432 B1 | | 2/2001 | Gieseke et al. |
| 6,235,195 B1 | | 5/2001 | Tokar |

* cited by examiner

*Primary Examiner*—Jeff H. Aftergut
*Assistant Examiner*—Gladys Corcoran
(74) *Attorney, Agent, or Firm*—Michael Best & Friedrich, LLP

(57) ABSTRACT

The invention describes an improved process for the sealing of alternating flutes of 'honeycomb' designed filters to be made after construction, or fabrication, of the basic filter structure, rather than during construction, as is shown in the prior art. The method seals both sides of the primary flutes as is typically done for one side in the prior art and then the media is rolled into a honeycomb shape so that secondary flutes, open on both sides of the roll are created. The roll is vertically orientated and then the lower end is immersed into a sealing compound to such a depth which will cause the sealing compound to travel up into the lower portion of the roll to a height above the height of the lower seal for the primary flutes. The sealing compound is allowed to cure, effectively sealing the secondary flutes. The roll is then cut along a line located above the height of the lower seal for the primary flutes and before the top surface of the sealing compound in the secondary flutes. When cut, a fully functional cylindrical honeycomb filter structure is formed having, on one side primary flutes sealed and secondary flutes open, and on the other side primary flutes open and secondary flutes sealed. In another embodiment, successive layers of filter media are aligned in parallel to form a rectangular, or panel, shaped filter, whose, flutes are sealed in a similar manner.

10 Claims, 5 Drawing Sheets

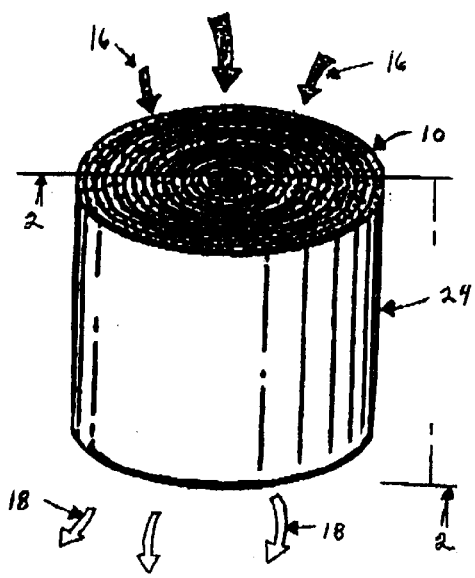
FIG. 1
Prior Art
FIG. 2
Prior Art
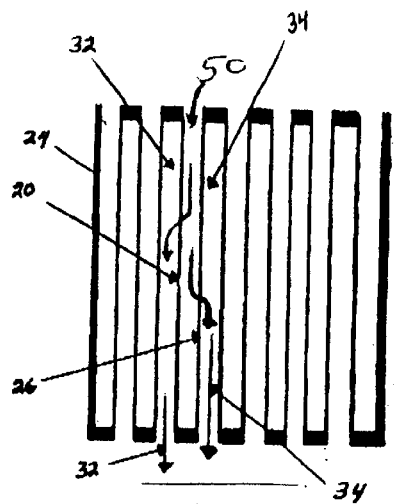
FIG. 3
Prior Art
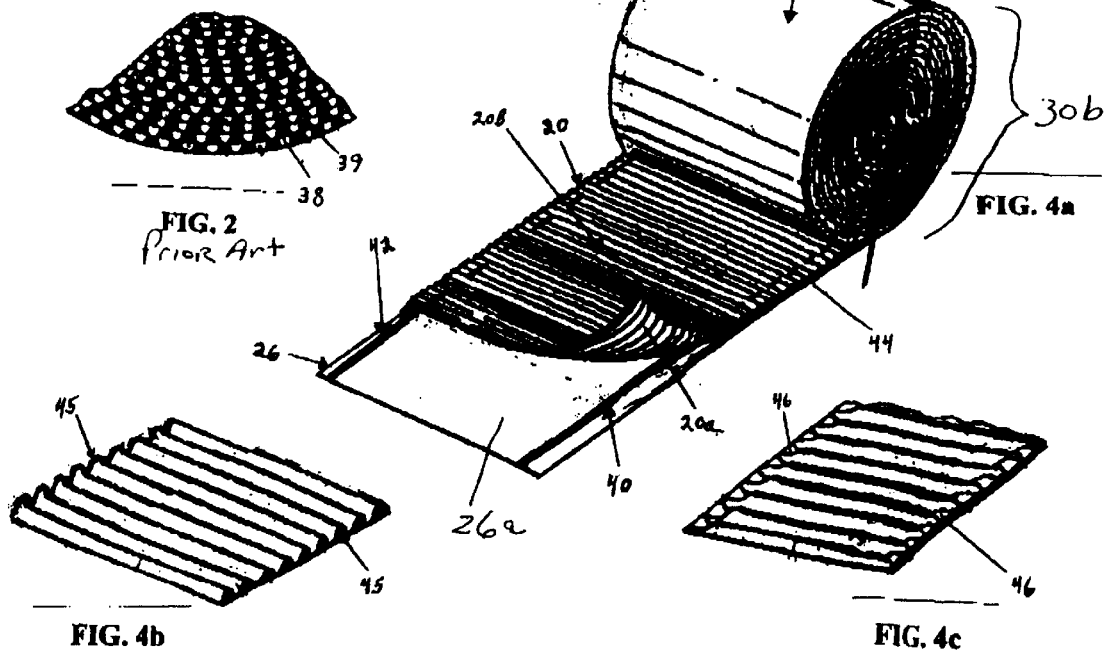
FIG. 4a
FIG. 4b
FIG. 4c

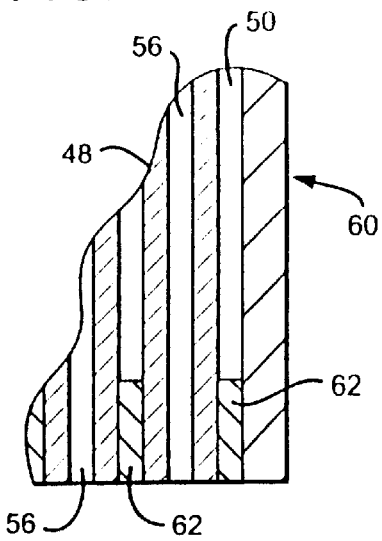
FIG. 18
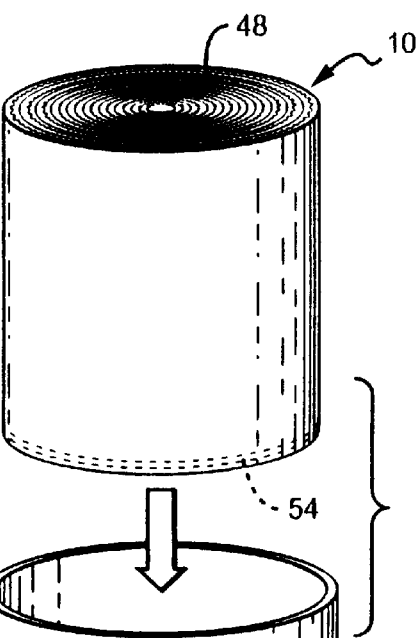
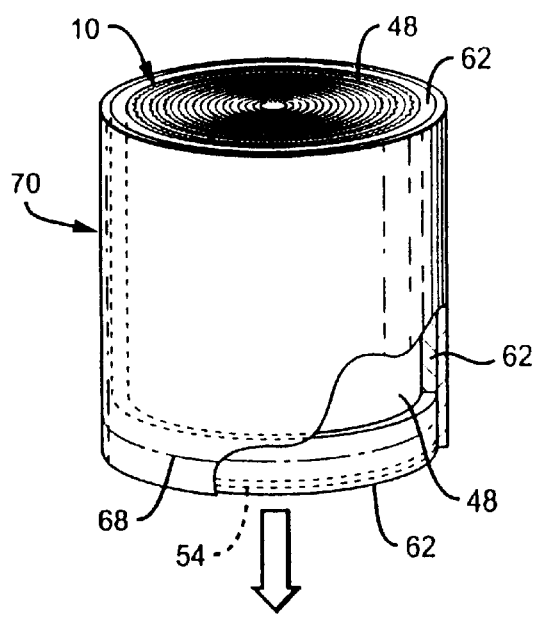
FIG. 19
FIG. 20
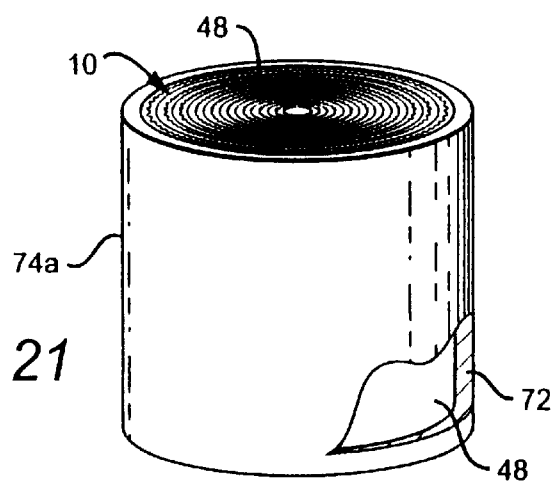
FIG. 21

METHOD OF SEALING, HOUSING AND CONSTRUCTING HONEYCOMB FILTERS

This application claims priority to U.S. Provisional Patent Application bearing serial. No. 60/256,566 dated Dec. 19, 2000 the disclosure of which is incorporated herein by reference.

TECHNICAL FIELD

The present invention relates to fluid filtering devices, more particularly, devices constructed using generally corrugated filter media in combination with flat media, hereafter, referred to as a 'Honeycomb designed' filtering element.

BACKGROUND OF THE INVENTION

There exists an ongoing effort in the filtration industry to maximize filter life while simultaneously trying to reduce filter size, weight, and costs. These efforts are accomplished in part by maximizing the amount of media surface area which reduces pressure drop across the filter and prolongs its useful life. It is also desirable for the housing structure supporting the filter to be of a simplified design or even eliminated entirely. All of these factors, including the methods used for manufacturing the filter element, must be considered for maintaining low production costs.

Pleated paper filters with rigid housings have long been the industry standard for most filtering applications. These filters, however, generally require relatively expensive hardware such as centertubes and endcaps and have relatively low filter densities and load capacities.

Attempts have been made to increase the filter density and load capacity of filter elements. This has included the development of orthogonal flow filters, more commonly referred to as "Honeycomb" filters.

FIGS. 1–3 depict a honeycomb filter and segments thereof which can be made from prior art methods. FIG. 1 illustrates a cylindrical filtering element 10. It is noted that fluid intake in this device is shown by arrows 16 and filtered fluids exit from the bottom end as shown by arrows 18. The filter element 10 typically includes an impervious barrier element 24 which is cylindrical in shape so as to be sized to receive the body of element 10 within. The purpose of barrier 24 is primarily to prevent entry of uncleaned fluid via the sidewalls of the element, thereby directing it in the flow shown by arrows 16.

FIG. 2 shows a fragmentary view of a portion of the top end of filtering element 10. Fluid 16 enters the filter through openings such as 38 and enter flutes which run essentially the length of element 10 but are plugged on the opposite end. Plugs 39 prevent entry of fluid 16.

As can be seen in FIG. 3, filtering occurs within element 10 due to alternating ends of adjacent flutes being sealed to prevent fluid transfer thereby forcing all fluid to pass through the media in order to exit the element. One possible flow pattern is shown wherein fluid 16 enters open flute 50 on the inlet of filter 10, is filtered across corrugated media layer 20 and exits via opening 32 on the outlet end of the filter. Alternatively, fluid 16 may be filtered sideways across the flat media layer 26 and exit via opening 34 at the outlet end of the filter. As fluids pass through a media wall, filtering occurs and particulate matter becomes lodged within the media itself. Because this loading will increase the face velocity at that point, particulate matter will tend to be collected at other points along the walls thereby evenly distributing the particulate matter throughout the filter until it is fully loaded.

This basic design for honeycomb filters is also well documented in the prior art. One such reference is U.S. Pat. No. 2,322,548 issued to Sigmund wherein an impervious board matrix separates a flat filtering sheet which is rolled into a cylindrical shape. Filtering occurs when the fluid entering the intake side must cross through the inner walls at a right angle to exit by the outlet side.

U.S. Pat. No. 2,210,397 issued to Dreiss uses a similar filtering scheme by carefully aligning two sheets of substantially flat filter paper with a specially designed top and bottom plates to direct airflow. U.S. Pat. No. 3,020,977 issued to Huppke et. al. introduces the additional feature of corrugated material between flat sheets, although the corrugated material performs no filtering function, but merely acts as a spacer. Likewise, U.S. Pat. No. 2,397,759 issued to Sigmund employs a corrugated member as a spacer.

None of the aforementioned references are able to achieve the high filtering density desired because of the use of construction materials which are merely structural, rather than material suited for performing both structural and performing a filtering function.

U.S. Pat. No. 4,410,427 issued to Wydeven was able to achieve the high filtering density desired in an orthogonal flow filter because of the use of materials which performed both a structural and a filtering function. Since Wydeven, numerous patents have been issued acknowledging the benefits of orthogonal flow filtering occurring from the use of honeycomb designed filters which include increased filter performance, reduced weight and overall outer dimension, as well as lower manufacturing costs.

Honeycomb filters provide benefits over other filter designs in certain applications. These benefits include: greater life expectancy, at equal efficiency; fixed geometry—no pleat bunching; more media per unit volume of filter; lower materials cost, for many applications; simple construction; and product differentiation.

Presently, honeycomb structures are being used throughout industry; offering advantages in many "non-filtering" applications. Some of the areas where product advantages are currently being obtained as a result of the honeycomb design are: 1) Automotive Catalytic Converters; 2) Structural Components; 3) Packaging and Container Materials; 4) Heat Exchangers; 5) Shock Absorbing Materials; and, 6) Aerospace Structural Components.

Prior Art Method of Producing Honeycomb designed Filter Elements

Basically, round honeycomb filters FIG. 1 and panel honeycomb filters FIG. 12 are produced by corrugating filter media. The honeycomb filter comprises a corrugated filter media sandwiched between flat sheets of filter media on either side.

As described earlier and depicted in FIG. 1, round honeycomb filter elements comprise one flat sheet and one sheet of corrugated media layer positioned on top of the flat sheet, adhesively connected thereto and which forms a sheet of filter media which is subsequently rolled to form the filter element. For panel honeycomb filter elements, alternating layers of corrugated filter media and flat sheets are utilized, stacked on top of one another.

As defined here, "primary flute" is the interior space between the corrugated media and first contact with the flat-sheet media. Prior art shows that the primary flutes are formed and sealed during the corrugating process.

As defined here, "secondary flute" is the interior space between the corrugated media and contact with flat-sheet media on the opposing side of the corrugated media. Prior art shows that the secondary flutes are formed and sealed during assembly of the filter element.

Use of the terms "primary" and "secondary" do not attempt to distinguish importance; the terms are merely used to describe one set of flutes from the other set.

The terms "primary seals" and "secondary seals" are used in the specification. These terms do not distinguish the importance of one seal over the other. Rather, primary seals refer to the seals present to plug the primary flutes and secondary seals refer to the seals present to plug the secondary flutes.

Problems and Limitations Associated with using Current State of the Art Sealing Methods Although, the previous patents cited claim various benefits, all are constructed using the same basic technology. Little attention has been given to reducing manufacturing costs or developing new, more efficient, methods of production.

For example, the same method of sealing the filter media has been used, beginning with U.S. Pat. No. 2,599,604 issued to Bauer et. al. in June of 1952 and has continued to be described in one of the most recent patents, U.S. Pat. No. 6,235,195 issued to Tokar in May of 2001. As is described in the prior art, the basic sealing method requires that a bead of sealant be applied to the filter media, to seal the secondary flutes, as the filter element is being constructed.

One significant limitation is that the secondary seals, which are located within the secondary flutes at the end of filter element 10 opposite the primary seals located within the primary flutes, can be formed only during construction or assembly of filter element 10. When round, cylindrical elements are made the secondary seals are formed as the cylindrical element is rolled spirally forming layer upon layer. Similarly, for panel designed filters, the secondary seals are formed sheet by sheet.

The current method of constructing and sealing elements is labor intensive and does not lend itself well to efficient automated production methods. This can cause significant problems associated with product appearance, performance, manufacture and cost.

Most prior art processes also limit the types and properties of the sealing resins which can be used to construct the filter. For example, a low viscosity resin cannot be used as a sealant since it would flow and prevent sealing of the flutes. Conversely, a resin having too high a viscosity, would not wick into and anchor itself to the filter media sufficiently enough to produce a good seal. Either of these conditions would compromise filter efficiency.

It is well established in the prior art that the existing sealing beads are made wide to promote sealing and are recessed in from the edge of the filter to prevent plugging of adjacent flutes. Both of these factors serve to reduce the amount of usable filter media, thus, shortening filter life and increasing operating restriction. These limitations also produce a filter having a non-smooth, non-rigid, inlet and/or outlet face, which is less than ascetically pleasing.

The sealing methods currently being used in constructing orthogonal flow filter elements, limit the types of filter media which can be used in making the filter. The type of media used can, in turn, limit the applications to which the filter can be utilized. As an example, current sealing methods do not allow for the sealing of orthogonal flow filters made from stainless steel filter media, while using hot molten metal as a sealant; nor the sealing of polypropylene media type filters, using a hot liquid thermoplastic polymer as a sealant.

Current sealing methods do not allow for the flutes to be potted; nor can they be vertically oriented during the sealing process. Due to the viscosity requirements of the sealing resins, the layers of single-faced media must be positioned horizontally during application of the sealing bead to prevent undesirable flow of the resin which would result in inadequate sealing of the flutes.

The desired resin viscosity for the sealing bead requires that it be made wide and set far enough into the flute to prevent the resin from escaping and plugging those flutes which must remain open. Also, the further the sealant is positioned into the flute to present escape and plugging, the less media there is available for filtering, resulting in an inefficient higher initial pressure drop and shorter filter life.

Assembly problems can occur if the layers or sheets are mis-aligned when they are stacked or rolled, i.e. brought together with the sealing bead; they cannot be repositioned without damaging the seal. A filter element assembled crooked or mis-aligned, must remain so if integrity i.e. complete plugging of the flute, is to be maintained.

Finally, limits are placed upon the integrity of the media used to construct filter elements. Sealing of the primary flutes can easily be accomplished on a corrugator using relatively non-rigid, non-stiff types of filter media, since the flutes are supported by the corrugating rolls during addition of the sealing resin. However, when sealing the secondary flutes, particularly when this occurs off the machine, stiffness of the media is more critical. A certain amount of pressure must be applied to the media during the rolling, or layering of the single-faced media to ensure the sealant flows within the flutes and makes good contact with the flute walls for an acceptable plug. This pressure is necessary to ensure adequate sealing of the flutes; however, the pressure could crush the flutes of a non-rigid type media.

As an alternative to applying resin for sealing the primary and secondary flutes, it is possible to roll the two sheets of media into the composite roll and inject sealing material into each appropriate flute end, however, this would be time consuming, labor intensive and not practical from a manufacturing point of view.

BRIEF SUMMARY OF THE INVENTION

The present invention describes a new method for assembling or manufacturing honeycomb filters which incorporates the vertical positioning of open flutes so they can become potted with sealing resin. My invention is applicable to either rolled filter media which forms a cylindrical honeycomb filter, or to filter media which is layered upon one another to form a rectangular shaped filter.

My process basically provides for filter media comprising both a flat-sheet and a corrugated sheet of filter material positioned one on top of the other and bonded on or near opposing sides using a sealing composition such that the sealing composition forms plugs on each side which also define confined flutes between the corrugated and flat-sheet filter material. The filter media is then assembled; either by rolling a predetermined length of the filter media; or by taking a plurality of predetermined lengths of the filter media and stacking them on top of each other. In either case, a series of substantially tubular shaped primary flutes which are plugged on both sides and a series of substantially tubular shaped secondary flutes which are unplugged are formed. One end of the filter having plugs is vertically positioned facing downward and is then inserted into a receptacle containing an amount of sealant which is sufficient for filling the unplugged flutes to a point higher than the lower plug for each of the confined flutes. After curing, the filter media is cut between the lower orientated plugs of the confined flutes but below the top surface of the sealant which filled a portion of each of the unplugged flutes. After cutting, the lower end is discarded leaving the remaining filter element which has a series of flutes which are plugged on only one end and a series of flutes which are only plugged on the opposite end.

A more detailed description for the first two embodiments is directed toward a cylindrical fluid filter for removing particulate matter, and includes a fluid impervious outer wrap, a roll of substantially flat filter media, a role of corrugated filter media, the nesting of said rolls together to form a composite filter media roll so that alternate corrugated and flat media layers are in contact, thereby forming a plurality of longitudinal flutes extending through the roll from one end to the other, the flutes being formed in two spiral series; where one series located on one side of the corrugated media are primary flutes and where the other series located on the other side of the corrugated media are secondary flutes, a sealant means disposed to plug the series of primary flutes on both ends of the composite roll so that both ends of the same flutes are sealed and fluid cannot enter through either end of the sealed flute.

For the first embodiment, the new method applies a bead of sealant to either side of the filter sheet in the manner best illustrated by the prior art in FIG. 4 of U.S. Pat. No. 3,025,963 issued to Bauer. Bauer seals both sides so that it can thereafter cut the media in half. The end result is to have two rolls of media having only one beaded side. My invention does not cut the filter media between the sealant beads to double the capacity of usable media. Rather, seals on both sides are required as will now be explained.

Once the flat-sheet and corrugated sheet have been beaded along both sides, the media is assembled by rolling the media to form a honeycomb filter which has both ends of the primary flutes sealed. If a problem occurs in the rolling process as where the created roll is uneven, the unevenness can be corrected and the media re-rolled since the secondary seals have yet to be formed.

Sealing of the primary flutes, on both ends, may be accomplished by three different means. The first example of sealing means is by laying a resin bead, at both edges of the flat sheet, between the flat and corrugated sheet as they come together while being processed through a corrugating machine. The second example of sealing the primary flutes at both ends is by forming a continuous resinous film over the ends of the flutes after the media is corrugated. The third example of sealing means is by collapsing both ends of the primary flutes, while, in some cases, adding a small amount of resin to the flute ends to ensure closure, or in some applications, thermally welding the primary flutes closed. Any single method or combination of these three methods may be used to seal the primary flutes on either or both ends of the roll, depending on the type of filtering application and the type of filter media required.

When the filter media is wound upon itself, it forms a second series of flutes, termed secondary flutes which are open on both ends. No seals are applied to the structure as it is being wound, as is the case in the prior art.

After winding, the resulting filter structure is vertically positioned and then inserted for potting by positioning it within a receptacle which can be made from, as examples, fiberboard, or PVA plastic containing, a predetermined level of self-curing resin. The outside diameter of the filter structure is almost the same dimension as the inner diameter of the tubular housing so that the annular space therebetween is negligible or non-existent.

As an example for the amount of resin to be used, a 0.25 inch deep pond of a one or two-part self-curing resin is placed within a tubular housing, sealed at the bottom to prevent leakage of the resin. As the roll of a predetermined length of filter media is potted or pushed down to contact the bottom of the tube, the resin is forced to flow up, and into, the secondary flutes and any other open areas of the structure face. The resin cannot flow into the primary flutes due to the primary seals which were formed as discussed earlier. The amount of resin positioned within the tubular housing is predetermined by which method is used to seal the primary flutes, being sufficient so that the resin level within the secondary flutes rises to a sufficient height above the primary flute seals.

At this stage, the manufacture can continue using either a preformed tube or a to-be-formed shell around the periphery of the filter.

Preformed Tube Embodiment

For this embodiment, a receptacle which comprises a preformed tubular housing is provided, which has a sufficient length and diameter to accept the media within, is stood on one end with its bottom end having a temporary impervious seal to prevent leakage of the potting resin out the bottom of the tube. The impervious seal can consist of, for example, a thin sheet of metal foil, plastic, or paper, bonded across the base end of the tube.

Once the filter media is displaced completely into the tube so that its lower end contacts the seal at the base end of the tube, and the resin has reached a maximum surface level height in the secondary flutes, the resin is allowed to cure.

Following curing and hardening of the resin, both the primary and secondary flutes are found to be sealed at the base end. Next, part of the lower end of the tube, filter media structure and tube sealant, is cut off at an appropriate height, thereby causing the primary flutes to become open while the secondary flutes remain sealed. This process produces a finished filter whose open flutes on either the upstream or downstream end of the filter are sealed on the opposing end. Thus, any fluid entering the open flutes on either end of the roll must pass through the filter media, thus being filtered, before exiting via the other series of open flutes on the other end.

Resin Molded Shell

A second embodiment is a slight variation where, instead of the receptacle being a tubular housing as discussed in the preformed tubing embodiment earlier, the receptacle is a tubular mold. The media is inserted in the same manner as above but is centered so that a substantially uniform annulus is maintained. Once the media is completely inserted into the mold and the sealant level has risen into the secondary flutes as described above, a shell forming means, preferably additional sealant or resin is next injected or delivered into the annular region of the mold from above. Time is provided for curing and then the resin formed shell and filter are ejected or removed from the mold and then cut in the same manner as described for the first embodiment. However, the advantage of this variation is that since the shell is formed directly on the outer circumference of the filter media, the shell serves to protect and help seal the filter better than can be expected for the first embodiment.

The above process produces a finished filter, containing a rigid outer impervious shell, whose open flutes, on the inlet or outlet end of the filter, are sealed on the opposing end.

Rectangular Filter Variation

A final variation of the process is directed to the manufacture of a rectangular fluid filter housing comprising a top, bottom, two sides, a front, and a back. The top, bottom and two sides of the filter housing being fluid impervious.

The assembly step for this embodiment comprises the stacking of a plurality of filter media one on top of the other.

In this embodiment, the predetermined lengths are smaller than for the tubular filter elements of the first two embodiments since smaller lengths are required for stacking. The stacking of the filter media is done so that the corrugated sheets of adjacent stacked filter media do not contact each other. The stacking is aligned so that confined flutes with plugs on either side are formed and open flutes on either side are formed.

As in the first two embodiments discussed earlier, a receptacle is required for holding a predetermined amount of sealant which will fill the open flutes when the stacked filter media is vertically orientated and inserted into the sealant and allowed to cure.

Sealant means are made as is discussed in embodiments one and two above, using one or a combination of the three sealing methods described to seal the primary flutes. Secondary flutes are sealed through the potting process described earlier, after which, the filter element is cut-off near its base end in a manner as discussed earlier for the cylindrical filter. This process produces a finished filter, with a preexisting housing, or, with a resinous outer shell, whose open flutes on either the upstream or downstream end of the filter are sealed on the opposing end. Thus, any fluid entering the open flutes on either end of the filter must pass through the filter media in order to exit via the other series of open flutes on the other end and is thereby filtered.

The specific sealing methods used to seal the flutes could also potentially be used to seal opposing flutes on sintered ceramic honeycomb substrates, such as those being used as substrates in catalytic converters, heat exchangers and/or diesel particulate filters, however, in these cases ceramic sealants would be preferred.

BRIEF DESCRIPTION OF THE DRAWINGS

The specific embodiments of the invention have been chosen for the purpose of illustration and description and are shown in the accompanying drawings which form a part of the specification wherein:

FIG. 5 is a cross sectional view taken along line 5–5 of FIG. 4a.

DETAILED DESCRIPTION OF THE PREFERRED EMBODIMENT

The preferred embodiments of the present invention are directed a new method for the sealing of commercially feasible, high density fluid filters which maintain high structural integrity without the need for additional support hardware i.e. center-tubes or end-caps.

Figure 4A:
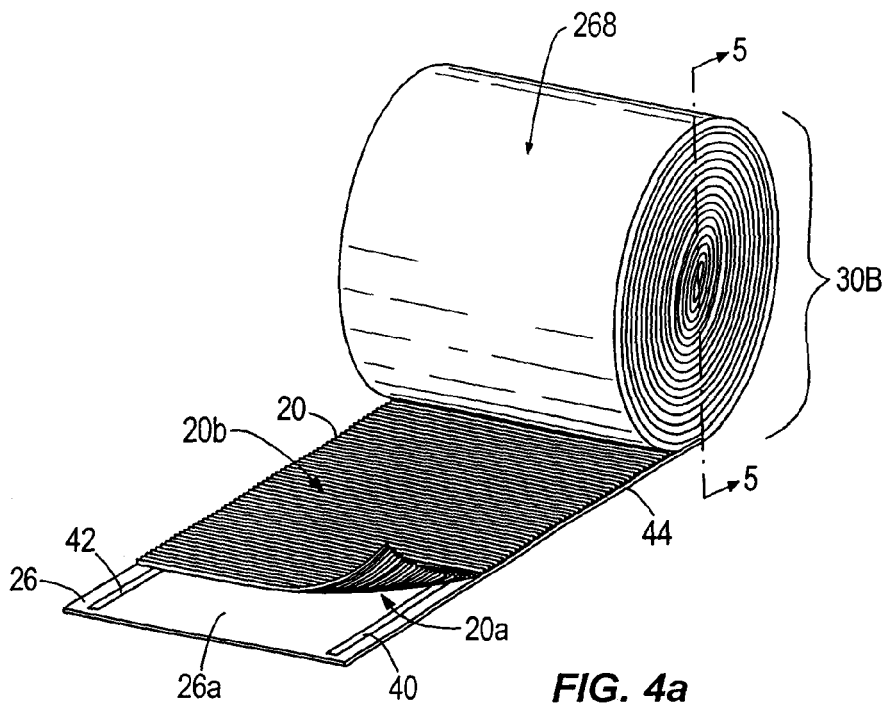
FIG. 4a is a perspective view of a honeycomb filter partially unassembled, showing the first of three methods of sealing both ends of the primary flutes, by putting resin beads between the corrugated sheet and the flat sheet of media, on opposing peripheral edges of the same sheet.

FIG. 4a shows the first step, construction of a partially finished filter. The technique for applying plugs or primary seals to both ends of the primary flutes was described earlier in the '963 patent issued to Bauer. FIG. 4a shows the primary flutes plugged on both ends by forming a plurality of plugs through the use of continuous beads of either thermoset resin or foaming urethane type resins 40 and 42.

Two layers, one a flat-sheet 26 and the other a corrugated sheet 20 are placed one on top of the other and rolled together forming filter media roll 30B. Both flat-sheet 26 and corrugated sheet 20 are preferably made of a similar porous filter media. Preferably, corrugated sheet 20 has a plurality of side by side peaks and valleys formed into a sinusoidal configuration. Corrugated layer 20 may also be of a different configuration scheme, such as triangular or trapezoidal shape or the like; however, the sinusoidal shape appears to maximize the filtering surface available and thus the loading capacity is thereby increased.

The two layers 26 and 20 are adhesively joined using resin beads 40 and 42 to form filter media 30. In addition, small dots of an adhesive resin may be positioned on the flute tips, where they contact the flat sheets, to aid in the bonding the two sheets together. When filter media 30 is rolled into a cylindrical shape to create a composite roll 30B, it appears that the composite roll is made up of alternate layers of media which spiral inwardly toward the center. It is preferable to have flat-sheet 26 as the outermost layer of the composite roll; however, it is not essential for the operation of the invention.

A bead of sealant, such as a one or two-part thermoset resin or other type of suitable resin material 40 is laid between media face 26a of media layer 26 and media face 20a of media layer 20 on one peripheral edge of the filter. A second bead of sealant 42 is then laid between face 26a and face 20a on the opposing peripheral edge of the filter. When the layers 20 and 26 are brought together, a series of hollow primary flutes 44 or passages are formed bounded by media layer 26 and media layer 20. The flutes may be tubular in shape with varied cross sections.

Figure 4B:
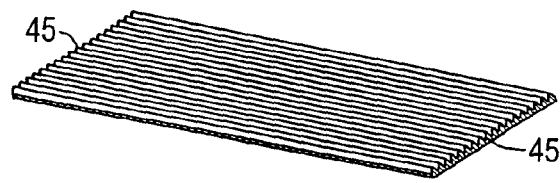
FIG. 4b shows a portion of the unrolled section of FIG. 4a, unassembled, showing the second of three methods of sealing both ends of the primary flutes by putting a continuous resin film over the ends of the flutes.
Figure 4C:
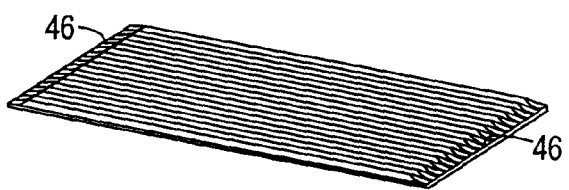
FIG. 4c shows a portion of the unrolled section of FIG. 4a, unassembled, showing the third of three methods of sealing both ends of the primary flutes, by collapsing the corrugated media layer against the flat media layer.
Figure 5:
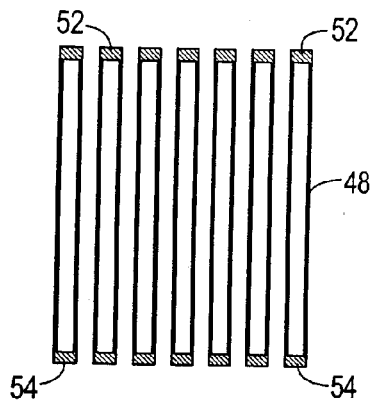
Figure 6:
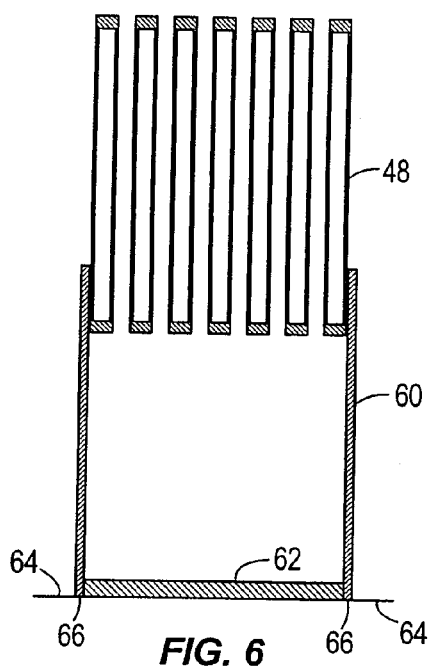
Figure 7:
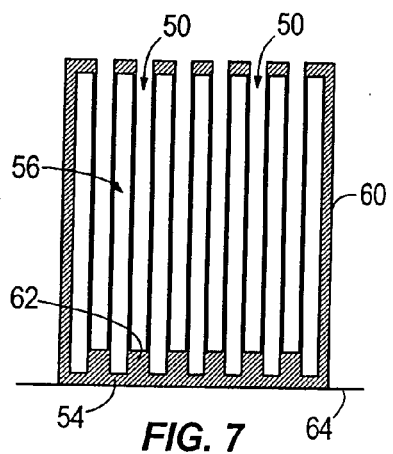
Figure 8:
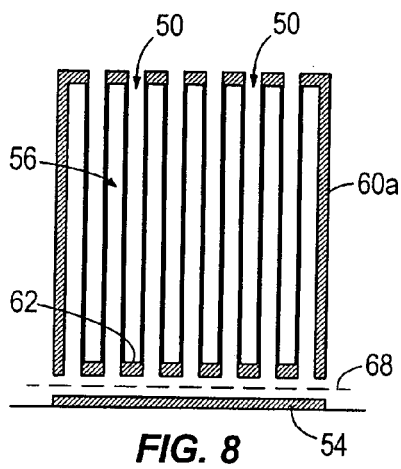
Figure 9:
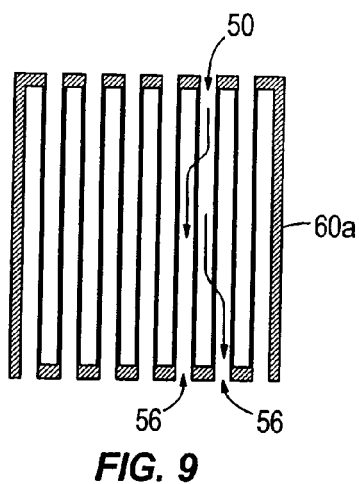
Figure 10:
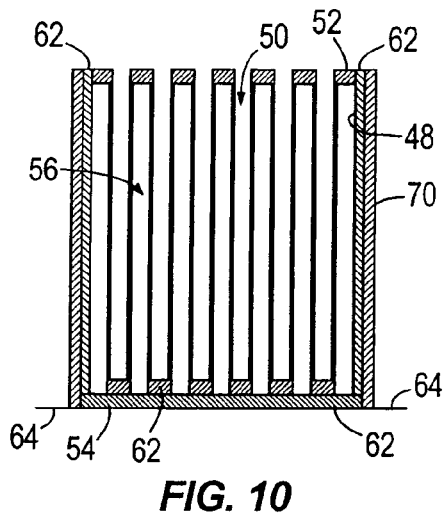
Figure 12:
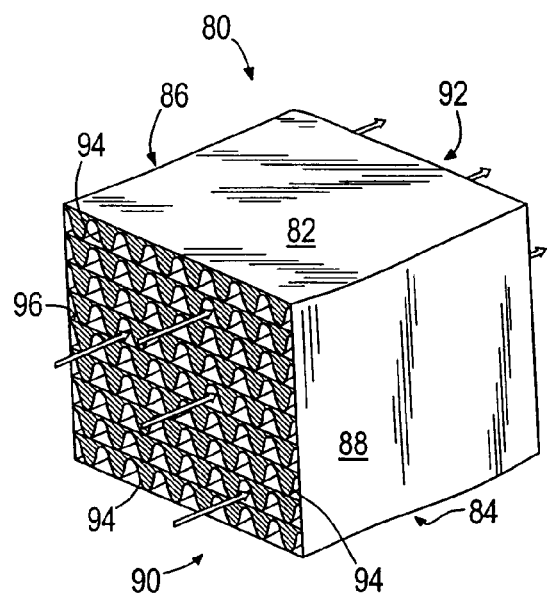
Figure 11:
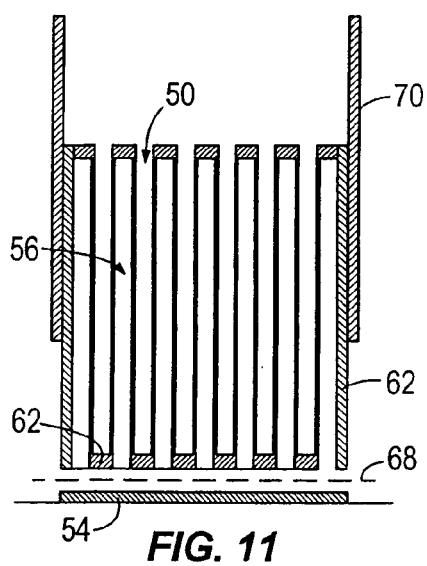
Figure 13:
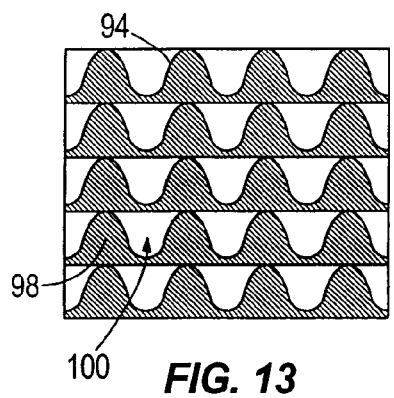
Figure 14:
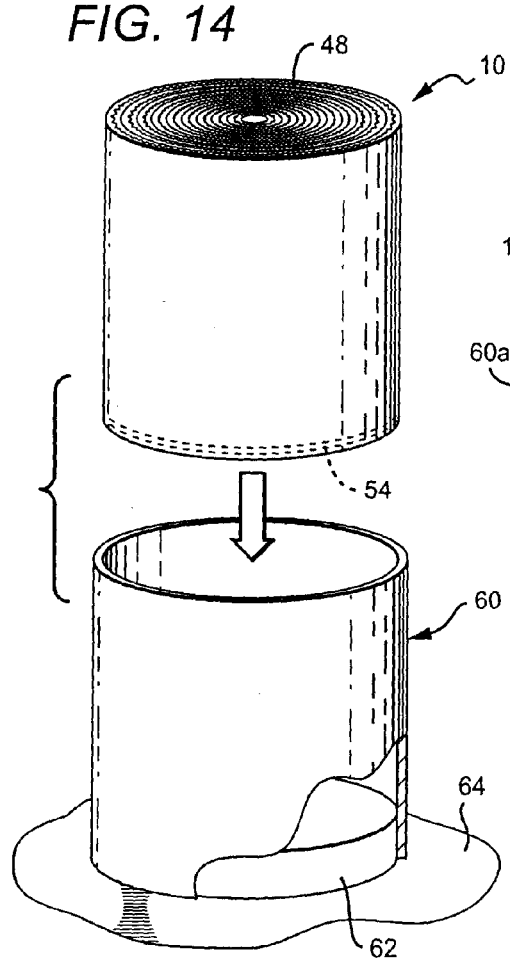
Figure 15:
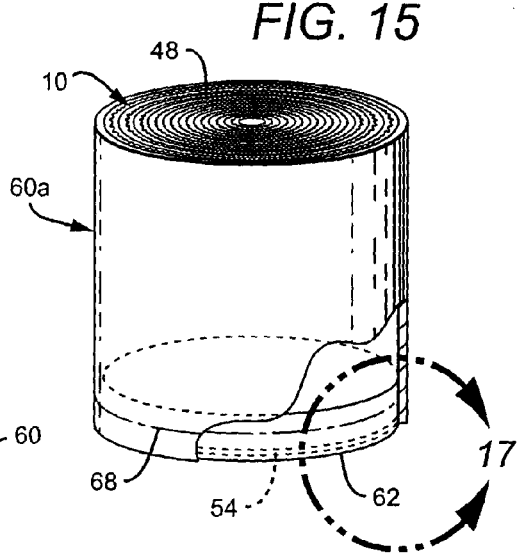
Figure 16:
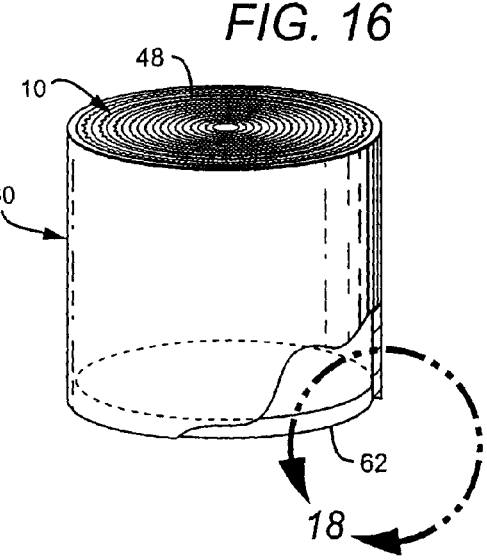
Figure 17:
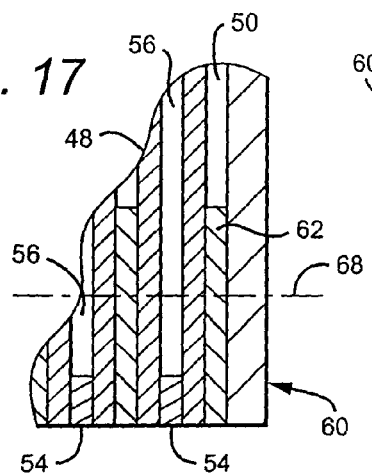

Referencing FIGS. 4b & 4c, as an alternative to applying beads 40 and 42, as is shown in FIG. 4a, it is possible to seal the opposing ends of the same primary flutes, as is illustrated in FIG. 4b, by casting a continuous strong resin film 45 over the open ends of the flutes, using preferably a viscous self-curing thermoset resin. As indicated by FIG. 4c, these same flutes can alternatively be sealed by collapsing both ends of the same primary flutes 46, on opposing ends of the filter media and then, in some applications, gluing the primary flute ends to keep them closed.

By way of example, collapsing the primary flute ends would be the preferred method for sealing primary flutes when using a stainless steel filter media. Once the flutes are collapsed they would then be arc welded to seal the ends shut. Thereafter, one end of the structure is inserted into a pond of hot molten metal to seal the adjacent secondary flutes.

In a second example, when using a thermo-plastic porous media, the primary flutes can be collapsed and then ultrasonically welded to seal them shut. Then, in a later process, one end of the structure would be inserted into a pond of hot molten plastic to seal the adjacent secondary flutes.

The secondary flutes are created by one of two methods. The first way is to roll a sufficient and predetermined length of filter media 30 to form a cylindrical filtering element 48 as shown in FIG. 14. This sufficient length would be available from roll 30B. An alternative way for creating the secondary flutes is to take equivalent predetermined lengths of filter media 30 and stack them one on top of the other to form a rectangular panel filter, similar to that shown in FIG. 13.

Figure 5:
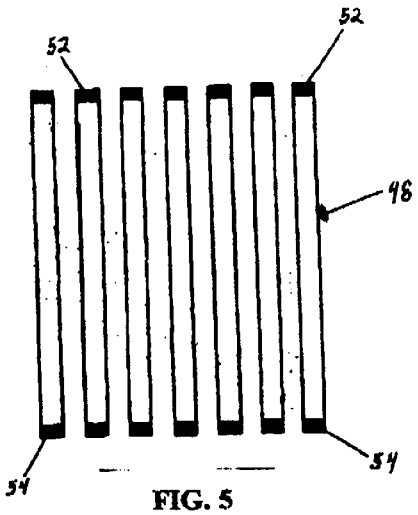

Using the roll method, secondary flutes are formed when corrugated face 20b of layer 20 comes into contact with flat sheet face 26b of layer 26. However, the rolling or winding procedure does not produce a finished filter element since, as can be seen, by referring to FIG. 5, secondary flutes are open on both ends of filter structure 10, while all the adjacent primary flutes are sealed on both ends.

According to one embodiment of this invention, the seals 52 plugging the primary flutes located on the top, or inlet, end of the filter element 48 are to remain permanently in place. However, the seals 54 plugging the primary flutes located at or near the bottom, or outlet, end of the filter structure 48 only serve as temporary, or fugitive, seals which will be removed later in the construction process.

Figure 6:
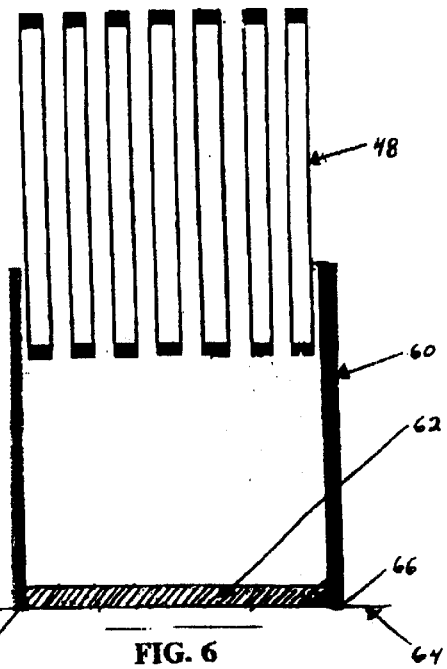
FIG. 6 is a cross sectional view as in FIG. 5, showing a filter partially inserted into a cylindrical tube sealed at one end and containing a small pond of liquid sealing resin.

FIG. 6 and FIG. 14 show how filter element 48 which is a predetermined length of filter media 30, wound upon itself and being inserted into a vertically orientated cylindrical tube 60, containing a predetermined amount of potting resin 62. Cylindrical tube 60 previously being sealed at its lower end with, as an example, an impervious thin barrier sheet 64 of metal foil, or paper, which is bonded across and onto the lower tube end surface with a contact adhesive 66, to maintain the potting resin within cylinder 60. Cylinder 60 can be made from almost any rigid material which is compatible with the type of potting resin 62 used. Preferably, a rigid thin walled tube constructed of fiberboard or PVC (polyvinyl chloride), or metal is used. The sealant or potting resin 62 can be of many different types, including resins having a low viscosity since the resin is contained within cylinder 60.

The range of potting resins used to seal the flutes can be quite broad, depending on the type of media used and what is to be filtered. The resins used can be selected from, but not be limited to, the following types: thermoset, thermoplastic, foaming urethanes, urethanes, epoxies, molten metals and ceramic filled polymers. The height of the potting resin pond is determined, in part, by the method used to the seal primary flutes.

Figure 7:
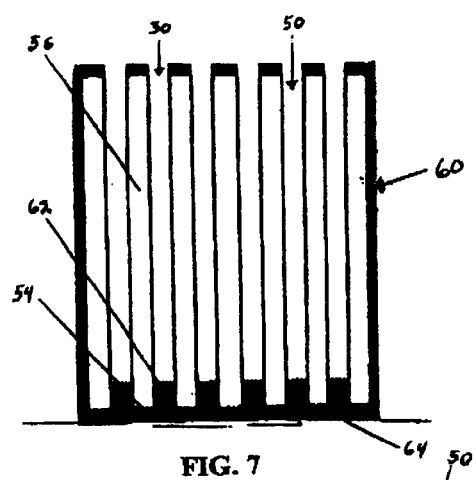
FIG. 7 illustrates the filter positioned within a cylindrical tube and where the sealing resin is forced to flow up, and into, all the open spaces at the base of the filter.

FIG. 7 and FIG. 14 show filter element 48 being displaced into cylinder 60 and to the bottom of the resin pond 62, thereby contacting barrier sheet 64, which forces resin 62 to flow up and into the open secondary flutes 50 of filter 48 and into any spaces existing between filter body 48 and the inner walls of cylinder 60. Resin will also flow up into the center of filter body 48 to seal the center core of the element. Resin cannot flow into the adjacent primary flutes 56 of filter 48 because sealant 54 plugs lower end of primary flutes 56. Potting resin 62 is then to allowed cure or harden through cross-linking, cooling, heating or by any other process, characteristic of the type of resin used.

Figure 8:
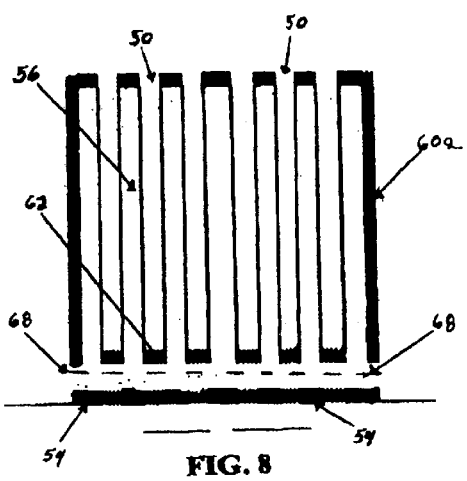
FIG. 8 shows an exploded view, indicating where the bottom of the filter element and cylinder is cut-off, thereby producing a finished functional filter.
Figure 17:
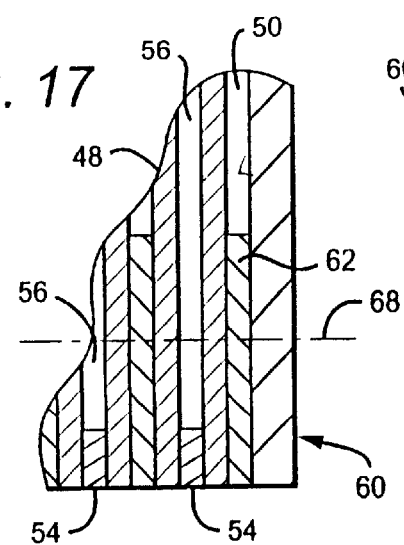
FIG. 17 is a view taken along line 17–17 of FIG. 15 illustrating the primary and secondary flutes plugged.
Figure 1:
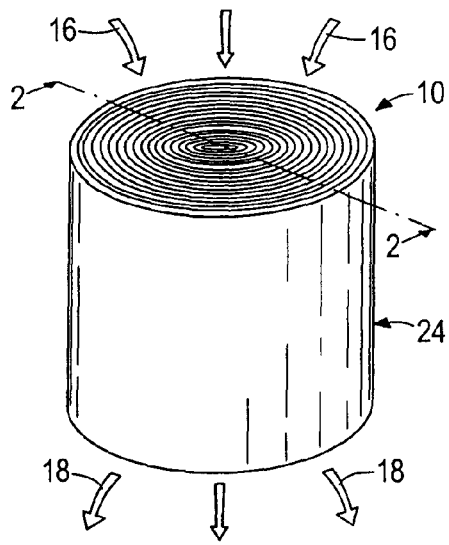
FIG. 1 is a perspective view of a prior art cylindrical filter.
Figure 2:
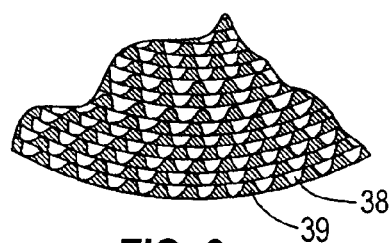
FIG. 2 is an enlarged portion of one face of the prior art embodiment of FIG. 1.

FIG. 8 and FIG. 17 show views, where cylinder 60, containing filter element 48, is cut off at a cut-line depicted generally as 68 near the bottom end of the filter. Cut-line 68 is at a height high enough to be above seals 54, which plug primary flutes 56, but not so high as to be above the seals formed by potting resin 62 which flowed into secondary flutes 50. The cutting of filter element 48 along cut-line 68 produces final cylinder 60a having primary flutes 56 now open on one side while secondary flutes 50 remain sealed.

The height of cut-line 68 is determined, in part, by which of the three sealing methods shown in FIGS. 4a–4c was initially used to seal the primary flutes 54 at the base of the filter.

The lower section of cylinder 60, after cutting, is discarded.

Figure 9:
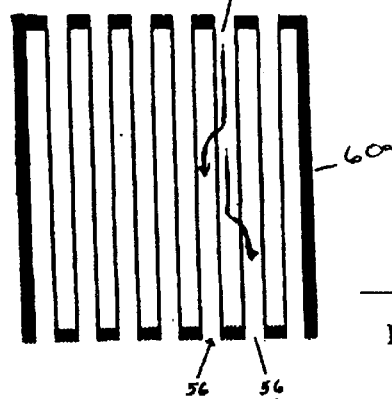
FIG. 9 a cross sectional view, showing the desired flow path through the filter.
Figure 16:
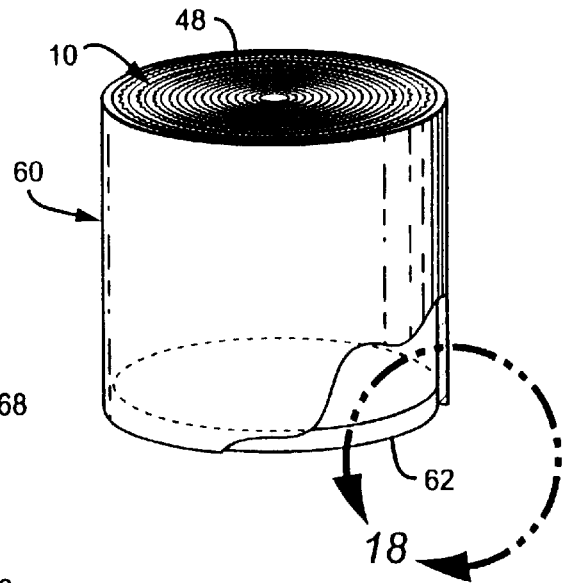
FIG. 16 is a perspective view of a cylindrical filter embodiment of FIG. 9.
Figure 3:
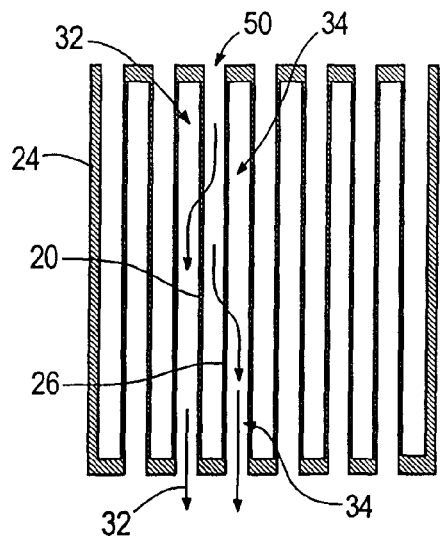
FIG. 3 is a cross sectional view taken along lines 2–2 of prior art FIG. 1.
Figure 18:
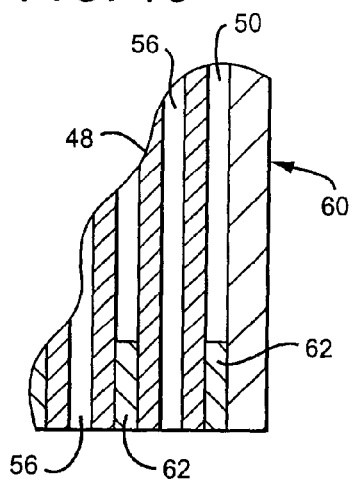
FIG. 18 is a view taken alone line 17–17 of FIG. 16 illustrating the plugged secondary flutes and unplugged primary flutes after cutting.

FIG. 9 and FIG. 18 show cross sectional views and FIG. 16 a perspective view of a completed filter element 60a. The preferred flow path is best illustrated in FIG. 3. Once filter element 60a is placed into operation, fluid entering the filter at one end may only enter the open flutes 50 and must exit via flutes 56 which are open on the other end of the filter. During this process, filtering occurs when the fluid must travel in a direction substantially orthogonal to that of its intake direction, pass through a sidewall of either corrugated media or flat media on its way to a passage with an open ended flute outlet. It is noted that flat-sheet and corrugated sheet elements of filter media 48 are porous and perform a filtering function, and are not merely used for structural purposes.

It must be strongly noted that the potting process, used to seal the flutes in the above preferred embodiment, can be used to seal flutes at either the outlet or inlet ends of the filter, depending upon the need. It must also be noted that the same process can be used to reverse the original process thereby reopening the closed flutes, while closing the now open flutes.

Figure 10:
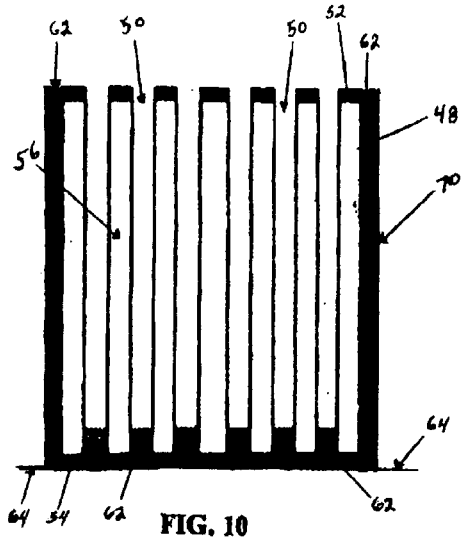
FIG. 10 a cross sectional view similar to FIG. 7 illustrating a filter positioned within a cylindrical mold and where the sealing resin has been forced to flow up, and into, all the open spaces at the base of the filter and after additional sealant has been added to the annular region.
Figure 19:
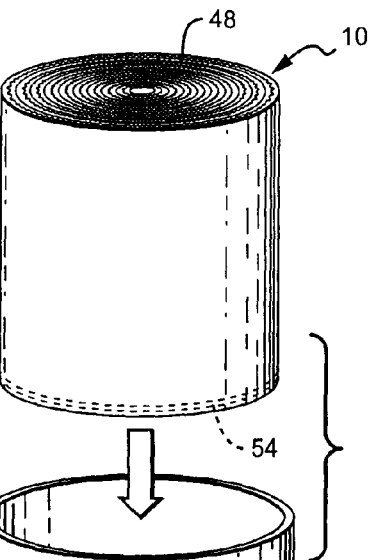
FIG. 19 illustrates a second version of the process where the filter media is being inserted into a mold.
Figure 19:
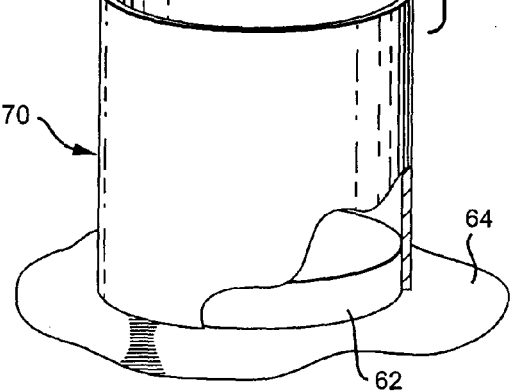
Figure 20:
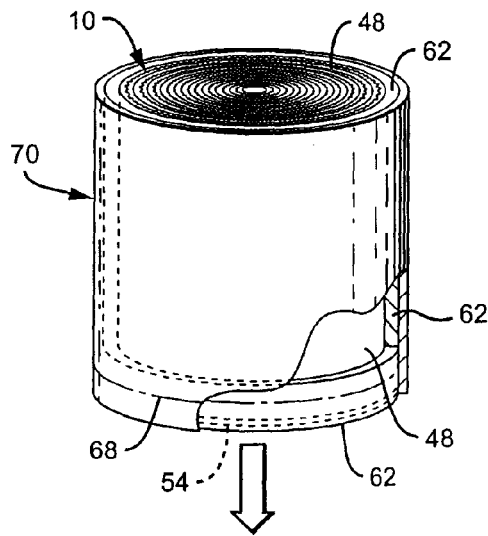
FIG. 20 illustrates the second version of the process where the filter media has been inserted into a mold and centered forming an annular region which is to be filled with a resin coating and thereafter ejected from the mold.

In the second version of my process which is illustrated by FIG. 10 and FIG. 19, a filter body 48 is provided as for the first version, where primary flutes 56 are sealed at both ends using any one, or a combination, of the three methods described in FIGS. 4a–4c. As for the first version, filter media 48 is inserted into a permanent tube, but for this version, it is inserted into a temporary molding tube 70 where an annular space is present between the outer surface of filter media 48 and the facing inner wall of molding tube 70. To insure an equidistant annular region, filter media 48 is preferably centered within molding tube 70 by a suitable mechanical positioning means (not shown). As for my earlier version, molding tube 70 contains a pond of sealing resin 62 which is forced up into the open secondary flutes as filter media 48 is fully inserted as well as into the annular region between the filter media 48 and the inner surface of the molding tube 70 near the bottom end of filter media 48.

Molding tube 70 is not a permanent part of the finished filter. It merely serves to cast a resin shell around the side periphery of the filter media during sealing of the secondary flutes 50. Preferably, a predetermined length of filter media 30 is provided and then wound so that it would be undersized; insuring a sufficient annular region for formation of the resin shell 72 once it is inserted into molding tube 70.

Figure 11:
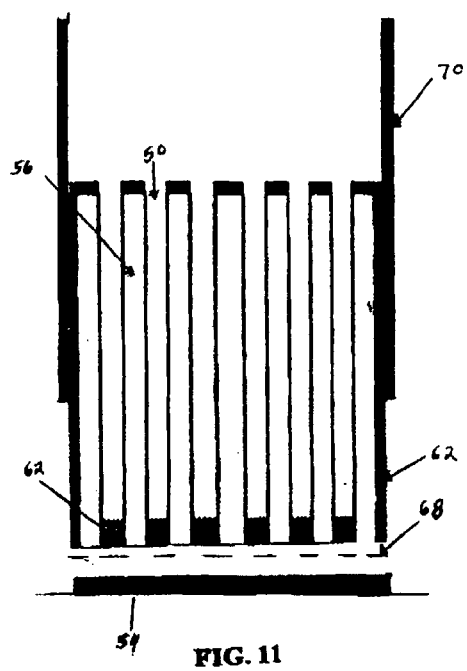
FIG. 11 shows an exploded view similar to FIG. 8, indicating where the bottom of the filter element and resinous shell is cut-off, to produce a finished functional filter.

After potting resin 62 becomes immobilized, through partial curing, additional resin 62 is delivered or injected into the mold to finish filling the annular space between filter media 48 and the inner wall of mold tube 70. Following cure of the resin, resin shell 72 containing filter media 48 is pushed out of the mold as is illustrated in FIG. 11, thereafter the end of the filter is cut off at cut-line 68 in the same manner as described earlier for the first version.

Figure 21:
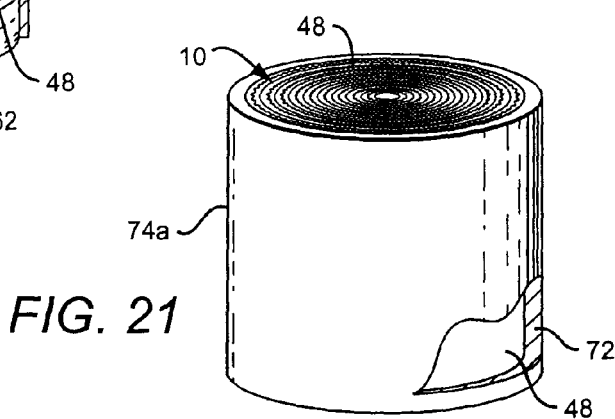
FIG. 21 illustrates the honeycomb filter of the second version after having its lower end cut and removed.

Once cut, a fully functional filter 74a, containing a rigid outer impervious shell 72, having open primary flutes and plugged secondary flutes on one end and closed primary flutes and open secondary flutes on the other end is formed as illustrated in FIG. 21. The flow paths through this finished filter are the same as is described in FIGS. 3 and 9 above.

Figure 12:
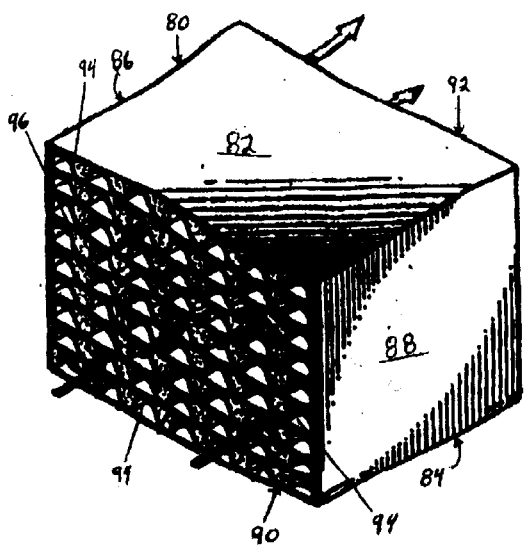
FIG. 12 is a perspective view of a prior art rectangular or panel filter.

A final version of my process can be used to form rectangular shaped filter elements as shown in FIG. 12. Predetermined substantially identical lengths of filter media 30 are provided for stacking manner placement in a rectangular shaped filter. Filter housing 80 comprises a top 82, a bottom 84 (not visible), two sides 86 (not visible) and 88. The front and back sides of housing 80 are open. Sides 86, 88 and the top and bottom of housing 80 are made of a of fluid impervious material which may either be a solid structural material such as fiberboard, plastic or metal; or be a resin-like coating applied in a liquid form and then allowed to harden.

Figure 13:
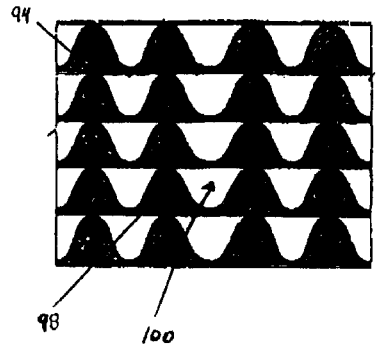
FIG. 13 is an enlarged fragmentary portion of one face of the embodiment in FIG. 12.
Figure 14:
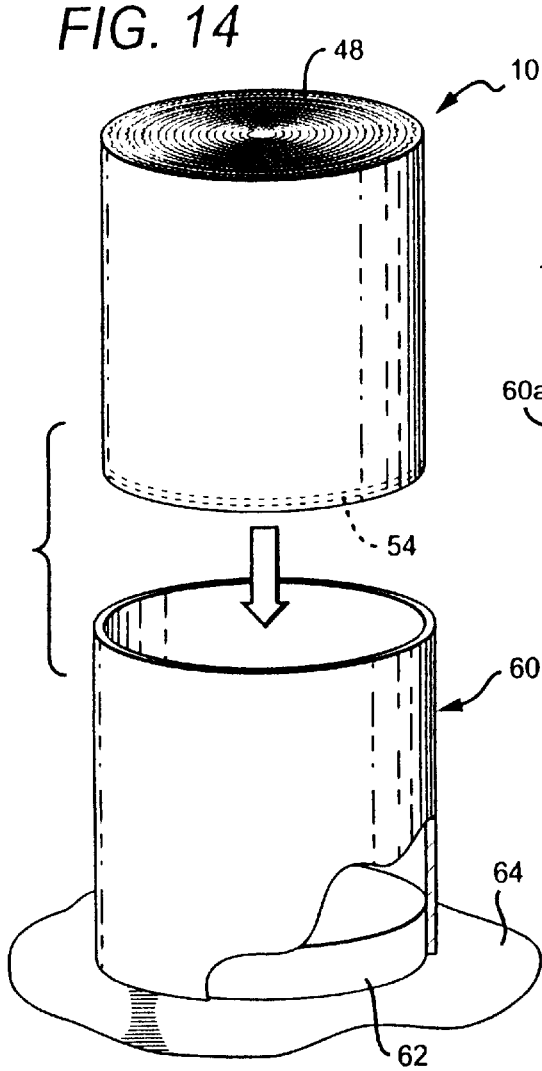
FIG. 14 is a perspective view of a cylindrical filter embodiment of FIG. 6.
Figure 15:
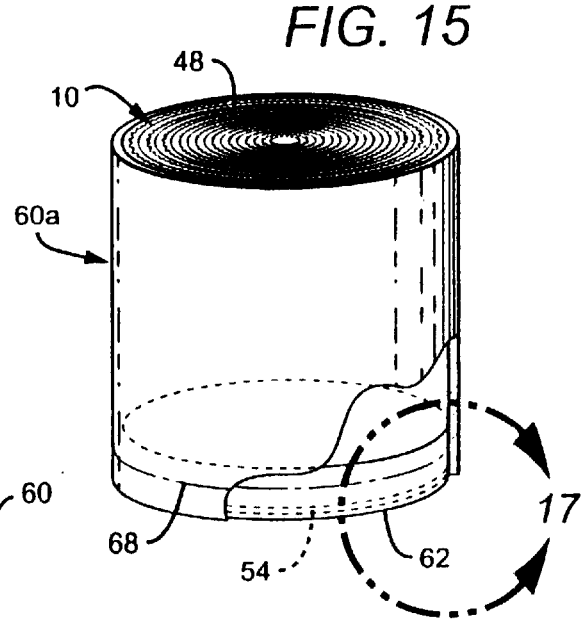
FIG. 15 is a perspective view of a cylindrical filter embodiment of FIG. 7.

FIG. 13 shows an enlarged fragment of the filter face 90 of FIG. 12. In this embodiment, layers of predetermined substantially identical lengths of filter media 30 are stacked creating a sandwich-like arrangement. The sandwich of alternate layers creates two series of flutes. The first series are primary flutes 94 which have plugs 98 on both ends as for the versions discussed earlier and the second series are secondary flutes 100 formed as a result of the stacking process and are open at both ends.

The stacked filter media structure is inserted into housing 80. One of the open sides of housing 80 is vertically lowered and immersed in a predetermined amount of potting sealant as for the first version of my process discussed earlier. Once the sealant has cured, housing 80 is cut along a cut-line (not shown) which will result in a final filter comprising housing (not shown) having primary flutes open and secondary flutes closed on one side and primary flutes closed and secondary flutes open on the other side. This rectangular shaped filter can be constructed using a permanent preexisting rectangular tube as an outer shell, or a to be formed in place resin shell, using a temporary rectangular molding tube. Both methods result in producing fully functional filters having the preferred flow pattern through the filter as is illustrated in FIGS. 3 and 9.

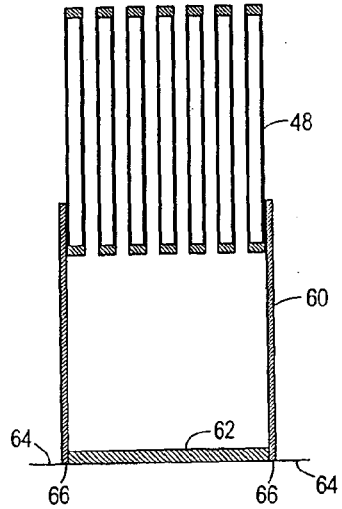

I claim:

1. A process for manufacturing a filter element comprising:

providing filter media comprising a flat-sheet of filter material and a corrugated sheet of filter material, positioned one on top of the other where said flat sheet and said corrugated sheet are substantially of the same length and width and are bonded to each other by using a sealing composition in a pre-determined, relatively narrow area on or near opposing sides such that the sealing composition forms plugs on either side which define confined flutes between the corrugated sheet and the flat-sheet;

assembling a predetermined length of said filter media such that a series of flutes which are plugged on both sides and a series of unplugged flutes are formed;

vertically positioning said predetermined length of filter media so that the plugs on one side of said confined flutes face downward;

providing a receptacle which contains an amount of sealant having a sufficient height for filling said unplugged flutes to a point higher than the downwardly facing plug for each of said confined flutes;

inserting the lower end of said downward facing filter media into said receptacle to a sufficient depth so that the sealant fills a portion of each of said unplugged flutes to a point higher than the downwardly facing plug for each of said confined flutes;

providing a sufficient time for said sealant to cure;

cutting said filter media so that the cut is above the downwardly facing plug for each of said confined flutes but below the top surface of the cured sealant which filled a portion of each of said unplugged flutes thereby forming a filter element having a series of flutes which are plugged on only one side and a series of flutes plugged on only the opposite side.

2. The process for manufacturing a filter as recited in claim 1 where said assembling step comprises rolling said predetermined length of said filter media such that a series of flutes which are plugged on both sides and a series of unplugged flutes are formed.

3. The process for manufacturing a filter as recited in claim 2 where said receptacle is a tubular housing sized for accepting said filter media within and where spacing between the tubular housing and filter media is negligible and where said cutting step also cuts said tubular housing.

4. The process for manufacturing a filter as recited in claim 2 where said receptacle is a tubular mold sized for accepting said filter media within and where sufficient space exists between the tubular mold and filter media to form an annular space and, following said inserting step of said filter media into said tubular mold and prior to said cutting step:

delivering a shell forming means into said annular space to substantially completely fill said annular space;

providing a sufficient time for said shell forming means to cure thereby forming a shell about the outer circumference of said filter media which is impenetrable to fluid; and, removing said filter media and shell from said tubular mold.

5. The process for manufacturing a filter as recited in claim 4 where said shell forming means is a thermoset resin.

6. The process for manufacturing a filter as recited in claim 1 where said assembling step comprises the stacking of a plurality of predetermined lengths of said filter media such that a series of flutes which are plugged on both sides and a series of unplugged flutes are formed.

7. The process for manufacturing a filter as recited in claim 6 where said receptacle is a rectangular housing sized for accepting said stacked plurality of filter media within and where spacing between the rectangular housing and filter media is negligible and where said cutting step also cuts said rectangular housing.

8. The process for manufacturing a filter element as recited in claim 1 wherein said sealant is a low viscosity sealant.

9. A process for manufacturing a honeycomb filter made from a pre-determined length and width of filter media where the filter media is made from a flat-sheet and a corrugated sheet, both made of filter material and adhesively bonded to one another by applying a relatively thick, narrow strip of sealing composition between said flat-sheet and said corrugated sheet in a predetermined, relatively narrow area running lengthwise along both sides of said flat-sheet material wherein said space between said flat-sheet and corrugated material define primary flutes and where said primary flutes are sealed on either side by said sealing composition, where the filter media is then rolled to form a honeycomb roll having a plurality of sealed primary flutes and creating a plurality of unsealed secondary flutes, the improved process comprising:

vertically inserting one end of the roll into a predetermined volume of sealant where the viscosity of said sealant permits it to enter and travel upwards within said secondary flutes and thereafter cure, plugging said plurality of secondary flutes at a level higher in position than the position of the lower sealed end for the plurality of primary flutes;

cutting from said roll the section containing plugged primary and plugged secondary flutes at a location the sealed end of the primary flutes and below the level of plugging of the secondary flutes thereby producing a honeycomb filter media which has a plurality of plugged primary flutes on one end and a plurality of plugged secondary flutes on the other end.

10. A process for forming a honeycomb filter comprising, producing a honeycomb filter having primary flutes plugged on one side and secondary flutes plugged on the opposite side by initially confining the primary flutes with plugs at or near both ends horizontally, and vertically sealing the secondary flutes on one end by immersing the filter to such a depth so as to have the surface level of sealant rise to a height which is higher than the plugs for the primary flutes on the lower end and following a sufficient time for curing, cutting the filter above the lower plugs of the primary flutes and below the surface level of the cured sealant in the secondary flutes.

* * * * *

UNITED STATES PATENT AND TRADEMARK OFFICE
CERTIFICATE OF CORRECTION

PATENT NO.    : 6,743,317 B2
DATED         : June 1, 2004
INVENTOR(S)   : Robert M. Wydeven It is certified that error appears in the above-identified patent and that said Letters Patent is hereby corrected as shown below:

Title page should be deleted and substitute therefore the attached title page.

Delete Drawing sheets Figs. 1-6 and substitute therefore the drawing sheets consisting of Figs. 1-21 as shown on the attached pages.

Signed and Sealed this

Twenty-eighth Day of September, 2004

JON W. DUDAS
*Director of the United States Patent and Trademark Office*

(12) United States Patent
Wydeven

(10) Patent No.: US 6,743,317 B2
(45) Date of Patent: Jun. 1, 2004

(54) METHOD OF SEALING, HOUSING AND CONSTRUCTING HONEYCOMB FILTERS

(76) Inventor: Robert M. Wydeven, 3613 Edgemere Dr., Appleton, WI (US) 54915

(*) Notice: Subject to any disclaimer, the term of this patent is extended or adjusted under 35 U.S.C. 154(b) by 147 days.

(21) Appl. No.: 10/015,614

(22) Filed: Dec. 17, 2001

(65) Prior Publication Data
US 2002/0096247 A1 Jul. 25, 2002

Related U.S. Application Data
(60) Provisional application No. 60/256,566, filed on Dec. 19, 2000.

(51) Int. Cl.$^7$ ............................................. B31C 13/00
(52) U.S. Cl. .................... 156/193; 156/210; 156/245; 156/267; 156/292
(58) Field of Search .......................... 156/184, 193, 156/210, 242, 245, 267, 292; 210/321.77, 321.86, 343, 493.1, 493.2, 493.3, 493.4, 506; 228/175, 177, 181, 183, 185, 186, 187; 55/520, 521, 524; 428/116, 182; 29/157.3, 157 R, 890.054, 902

(56) References Cited

U.S. PATENT DOCUMENTS

| | | |
|---|---|---|
| 2,599,604 A | 6/1952 | Bauer et al. |
| 3,020,977 A | 2/1962 | Huppke et al. |
| 3,025,963 A | 3/1962 | Bauer |
| 4,065,341 A | 12/1977 | Cub |
| 4,410,427 A | 10/1983 | Wydeven |
| 4,589,983 A | 5/1986 | Wydevan |
| 5,024,870 A | 6/1991 | Jackson |
| 5,240,540 A * | 8/1993 | Matsumoto et al. ........ 156/252 |
| 5,435,870 A * | 7/1995 | Takagaki et al. ............ 156/189 |
| 5,772,883 A | 6/1998 | Rothman et al. |
| 5,820,646 A | 10/1998 | Gillingham et al. |
| 5,895,574 A | 4/1999 | Friedmann et al. |
| 5,902,364 A | 5/1999 | Tokar et al. |
| 6,179,890 B1 | 1/2001 | Ramos et al. |
| 6,190,432 B1 | 2/2001 | Gieseke et al. |
| 6,235,195 B1 | 5/2001 | Tokar |

\* cited by examiner

*Primary Examiner*—Jeff H. Aftergut
*Assistant Examiner*—Gladys Corcoran
(74) *Attorney, Agent, or Firm*—Michael Best & Friedrich, LLP

(57) ABSTRACT

The invention describes an improved process for the sealing of alternating flutes of 'honeycomb' designed filters to be made after construction, or fabrication, of the basic filter structure, rather than during construction, as is shown in the prior art. The method seals both sides of the primary flutes as is typically done for one side in the prior art and then the media is rolled into a honeycomb shape so that secondary flutes, open on both sides of the roll are created. The roll is vertically orientated and then the lower end is immersed into a sealing compound to such a depth which will cause the sealing compound to travel up into the lower portion of the roll to a height above the height of the lower seal for the primary flutes. The sealing compound is allowed to cure, effectively sealing the secondary flutes. The roll is then cut along a line located above the height of the lower seal for the primary flutes and before the top surface of the sealing compound in the secondary flutes. When cut, a fully functional cylindrical honeycomb filter structure is formed having, on one side primary flutes sealed and secondary flutes open, and on the other side primary flutes open and secondary flutes sealed. In another embodiment, successive layers of filter media are aligned in parallel to form a rectangular, or panel, shaped filter, whose, flutes are sealed in a similar manner.

10 Claims, 5 Drawing Sheets